Jan. 13, 1942.  E. E. WINKLEY  2,269,924
INTERNAL COMBUSTION ENGINE
Filed Aug. 30, 1940  3 Sheets-Sheet 1

INVENTOR
E. E. Winkley
by his attorney
Wm. H. Sellars

Jan. 13, 1942.        E. E. WINKLEY        2,269,924
INTERNAL COMBUSTION ENGINE
Filed Aug. 30, 1940        3 Sheets-Sheet 3
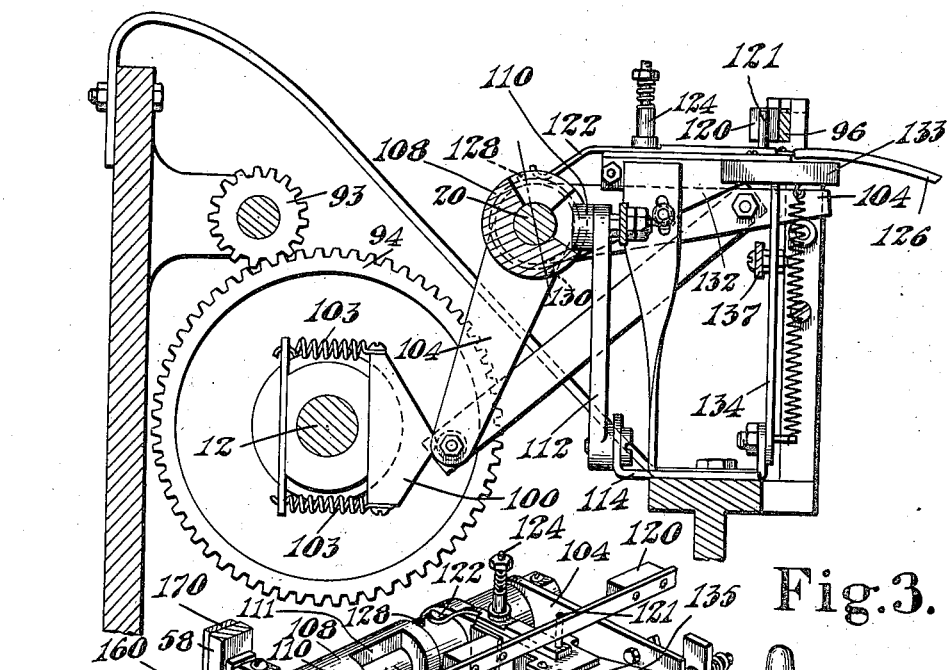

Patented Jan. 13, 1942

2,269,924

UNITED STATES PATENT OFFICE 2,269,924

INTERNAL COMBUSTION ENGINE

Erastus E. Winkley, Lynn, Mass.

Application August 30, 1940, Serial No. 354,874

18 Claims. (Cl. 123—41)

This invention relates to internal combustion engines and is illustrated as embodied in an engine of the class described which will be specially useful in various kinds of boats, such as cabin cruisers, and in land vehicles such as military tanks.

While it has heretofore been proposed to provide engines for marine use which may be reversed at will, it has been necessary in order to secure the desired efficiency and speed, to provide a number of manual controls which must be operated in a certain timed relation to each other to secure the best results. In other words, no little skill and training has heretofore been required to secure a desirable performance. Moreover, such prior constructions are apt to operate unevenly and to discharge into the manifold, and thence into the surrounding air, unexploded charges of mixed air and gasoline vapor, with results that are disagreeable, and even dangerous in such enclosed spaces as the engine compartment of cabin cruisers and military tanks.

It is an object of this invention to provide a single controller member with connections so arranged as to secure, in a power boat, almost instantly full speed ahead or astern. In land vehicles, my improved engine may be instantly reversed, but, due to the inertia involved, the speed must be built up more gradually. It is a further object of the invention to provide an engine wherein the reversing lever also controls the speed of the engine and the proper timing of the ignition. A still further object of the invention is to obviate the possibility of discharging an unexploded mixture of air and gasoline vapor into the surrounding space.

To these ends, and in accordance with an important feature of my invention, means is provided under control of a single controller member for causing endwise shifting of a rotary cam shaft arranged to operate the intake and exhaust valves of an internal combustion engine, said controller member having connections also to control the timing of the ignition and the speed of the engine. By this single controller member it is possible to control a reversible motor geared to the crank shaft of the engine to initiate rotation of said crank shaft alternately in opposite directions and to control the speed thereof so that a boat, for instance, may be caused to move forward or astern at full speed or at any desired lesser speed, while an intermediate position of the controller member results in interruption of the ignition circuit and termination of the engine operation.

It is an important feature of the invention that provision is made for locking the valve operating cam shaft against endwise movement for a predetermined interval upon reversing the direction of rotation of the engine and thus preventing opening of the intake valve and the consequent discharge into the manifold, and thence into the space around the engine, of an unexploded charge of fuel taken in by the intake valve while the cam shaft was rotating in the direction preceding reversal.

Another feature of importance resides in the provision of means, controlled by said single controller member, for advancing or retarding the spark in accordance with the direction and the speed of rotation of the cam shaft.

These and other important features of the invention and novel combination of parts will now be described in the specification and then pointed out more particularly in the appended claims.

In the drawings:

Fig. 3 is a view taken along the broken line III—III of Fig. 1 looking in the direction of the arrows;

Fig. 4 is detail perspective view looking down from above on the right end of the showing in Figs. 1 and 2;

Fig. 5 is a sectional view taken along the line V—V of Fig. 1 looking in the direction of the arrows;

Fig. 6 is a detail plan view of parts at the right in Fig. 4; and

Fig. 7 is a detail view of the starting switch.

Figure 1:
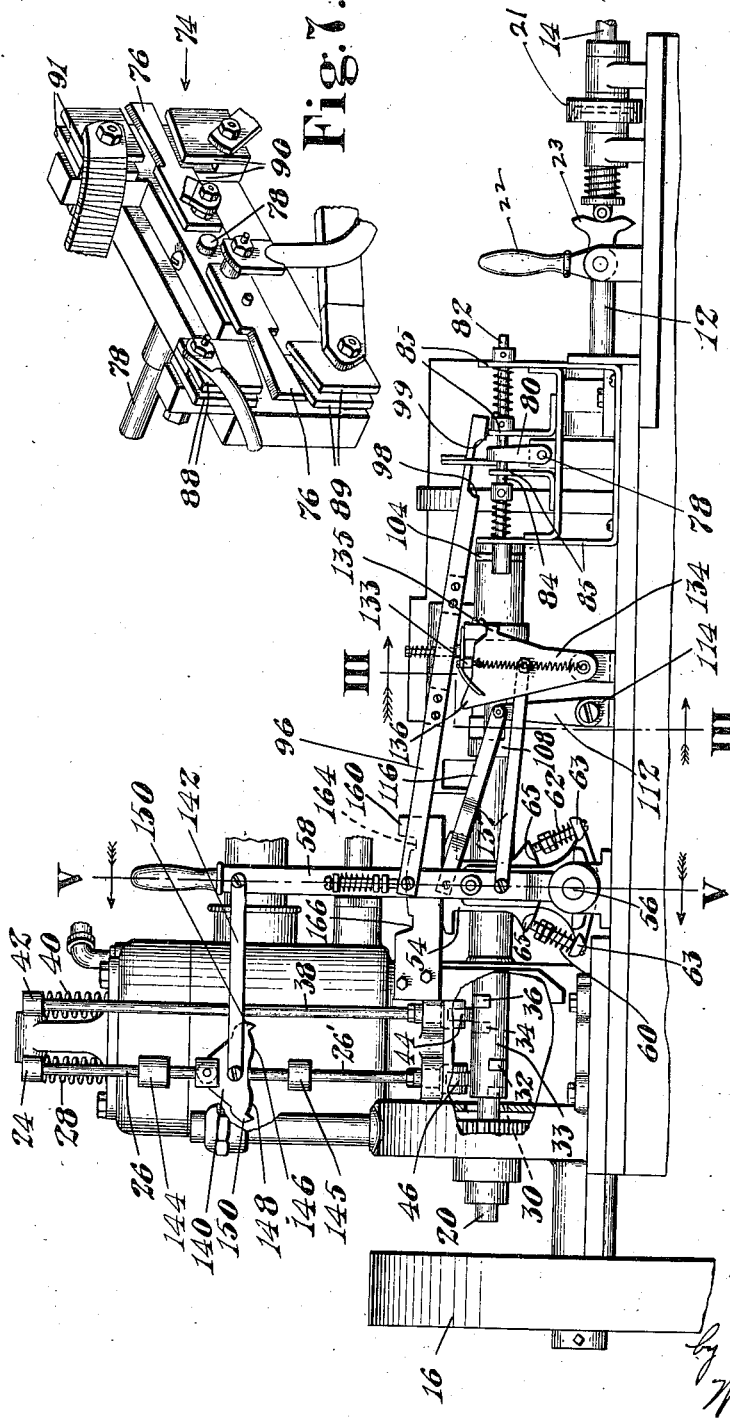
Fig. 1 is a view in side elevation of an engine illustrating one embodiment of the invention.

In the drawings there is shown a cylinder 10 which may be that of a single cylinder engine or one cylinder of a multi-cylinder engine. Within the cylinder 10 is a piston (not shown) connected by the usual crank arrangement to a shaft 12 (Figs. 1–2) which serves to transmit power of the engine to a propeller shaft 14 (Fig. 1), a fly-wheel 16 being provided on the shaft 12 as a momentum device in the usual manner. Geared to the shaft 12 is a cam shaft 20 (Fig. 1) by gearing so arranged that the cam shaft 20 turns at half speed of the crank shaft 12.

While the shaft 14 has been referred to as a propeller shaft, it will of course be understood that shaft 14 may be a drive shaft for other purposes, such as in motor driven vehicles and particularly in military tanks where it is advantageous to be able to move as rapidly in a reverse direction as in a forward direction. Due to the inertia to be overcome in starting such a heavy vehicle as a tank, it is necessary to provide a clutch as at 21 (Fig. 1) and an operator-controlled member such as the hand lever 22 to move the double cam 23 in applying the clutch 21, one member of which is fixed to the shaft 12 and the other to the shaft 14. By reason of the double cam, the clutch can become effective upon movement of the hand lever in either direction. It will be understood that any suitable arrangement of clutch and manual control may be substituted for that shown.

The engine is provided with the usual ignition chamber with an intake valve, an exhaust valve, and an igniter or spark plug. Both the valves are mechanically operated and the ignition is of the usual jump spark, high tension type. The intake valve is moved to open position through a walking lever 24 (Figs. 1 and 2) and a rod 26, 26' pivoted to the lever, the latter being rocked in the reverse direction by a spring 28. Power to operate the rod 26, 26' in an upward direction is furnished by either of two intake cams 30, 32 (Fig. 1) on a hollow cam shaft or sleeve 33 mounted on the cam shaft 20, whereby the intake valve is opened, closing of the valve being caused by the spring 28. The exhaust valve is moved to open position by means of either of two cams 34, 36 on the cam shaft or sleeve 33 through a rod 38, and to closed position by a spring 40 operating on a walking lever 42, to the other end of which the rod 38 is pivoted. The rod 38 carries a roller 44 to contact either of the cams 34 and 36, while the rod 26, 26' carries a roll 46 to contact either of the cams 30 and 32.

The cams 30, 32 and 34, 36 are carried on or are integral with the hollow shaft or sleeve 33 which is provided with a pin and slot (35 and 37) connection (Fig. 2) with the shaft 20 to rotate therewith, but is slidable longitudinally thereof to bring the sets of cams alternately into cooperative relation to the rods 26, 26' and 38, respectively. The sleeve 33 is provided with a grooved collar 50 (Figs. 4 and 5) for the reception of a roller 52 on a stud carried by a lever 54 movable about a pivot pin 56. Mounted rotatably on the same pivot pin 56 is a hand lever 58 which serves as the single controller member for all operations of the engine, i. e., by which the engine is caused to run in either direction and to pick up or reduce speed or to come to rest. Upon moving the control lever 58 to its neutral or stop position, the cam shaft or sleeve 33 is also moved to its neutral position, as shown in Fig. 1, in which neither of the intake valve cams 30, 32, and neither of the exhaust valve cams 34, 36, are in position to operate the intake and exhaust valves. The cam shaft 33 can always be moved to its neutral position by the controller member 58 but not beyond neutral position when the controller member is moved through neutral to reverse the engine, as will hereafter be described. As shown, the hand lever 58 is connected to operate the lever 54, and hence the sleeve 33, through springs 60 and 62 (Fig. 1) secured in place between two sets of abutments, comprising abutments 63 on the lever 58 and abutments 65 on the lever 54. The purpose of the spring arrangement is to permit movement of the hand lever or controller 58 independently of the lever 54, it being understood that the lever 54 will move later (when free to do so) under the force stored up in one of the springs 60, 62 by movement of the hand lever 58 from its neutral position shown in Fig. 1. In other words, since the control lever 58 performs other functions besides that of shifting the cam sleeve longitudinally of the cam shaft 20, it is freely movable at any and all times. If, for instance, the lever 54 is locked against movement, as hereinafter described, the springs 60, 62 permit movement of the controller member 58 with respect to the locked lever 54.

Figure 2:
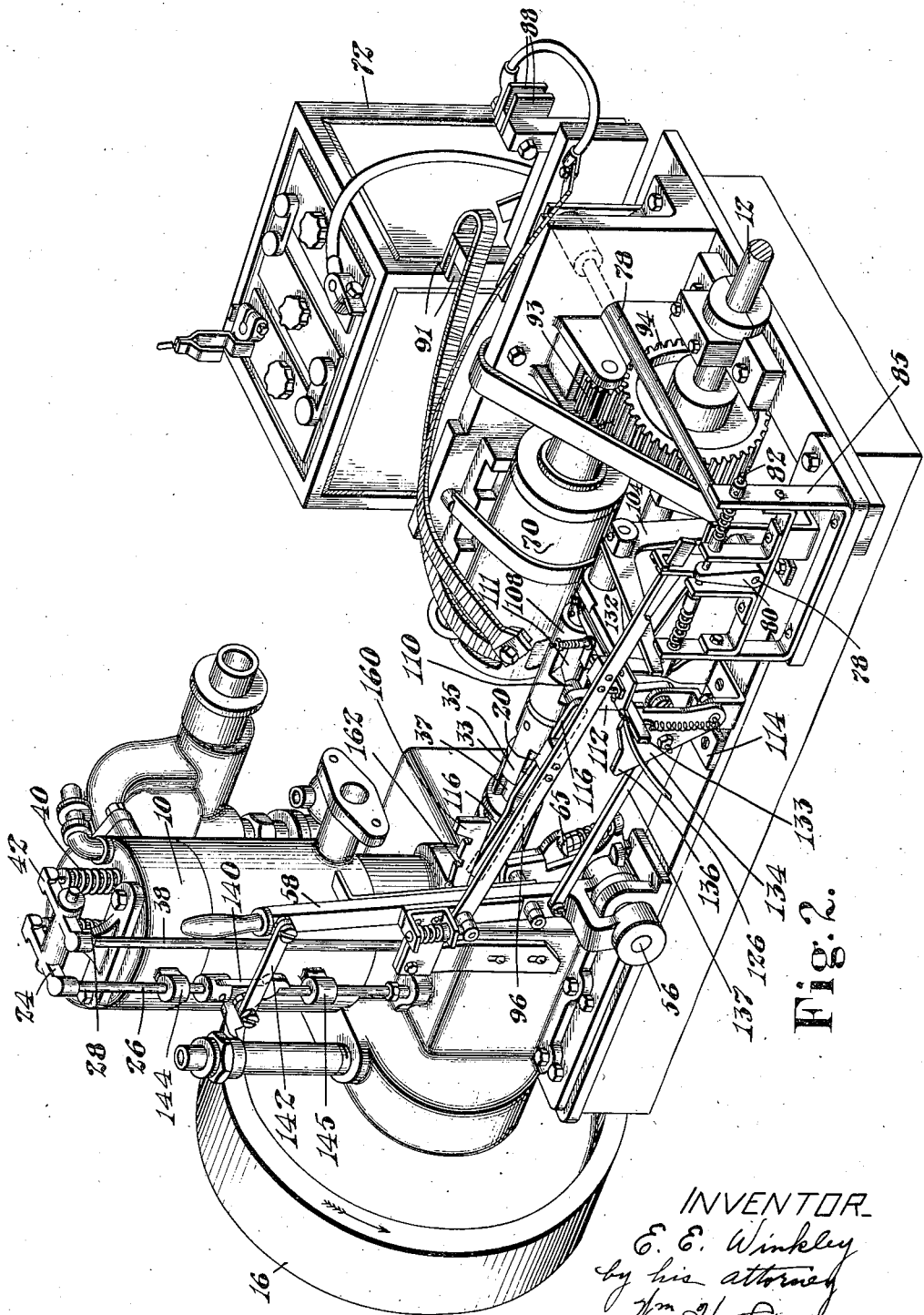
Fig. 2 is a perspective view of the engine shown in Fig. 1, showing also details of the reversing starting motor and battery.

Upon reference to Fig. 2, it will be seen that a starting motor 70 is provided to start the engine, this motor being of a well-known reversible type. As shown, it is energized by a battery 72 having wire connections to a double pole switch 74, shown in detail in Fig. 7. A two-arm switch member 76 is secured to one end of a shaft 78, the other end of said shaft having secured thereto a lever arm 80 (Figs. 1 and 2) arranged to be held yieldingly in a neutral vertical position by spring pressed rods 82 and 84 pressing on opposite sides of the lever arm 80. As shown, the rods are supported slidably in light metal posts 85, collars being fixed to the rods to enable springs to operate the rods. When the lever arm 80 is in vertical position, the switch member 76 is in its horizontal neutral position (Fig. 7). If the arm 80 (Figs. 1 and 2) be pulled over to the left (Fig. 2), the switch member 76 (Fig. 7) will be rocked clockwise in the latter figure to engage its opposite ends in stationary switch members 88 and 90 whereby current flows from the battery 72 through wire connections to and through the windings of the electric motor 70 in one direction, whereas movement of the arm 80 and switch member 76 in the other direction engages the switch 76 with switch members 89 and 91 and current flows in the reverse direction through the motor 70 which then rotates in a direction the reverse of that first mentioned. Since the motor 70 has its armature shaft provided with a pinion 93 (Figs. 2 and 3) constantly in mesh with a gear 94 fixed to the crank shaft 12 of the engine, the latter may be rotated first in one direction, then in the other, by the starting motor 70.

As stated above, the starting motor is controlled by the manual control lever 58. This is conveniently effected by providing a link 96 (Figs. 1 and 2) pivotally connected at one end to the lever 58 and having a notched portion at its other end to provide two shoulders 98, 99 (Fig. 1) which may be alternately engaged with the upper end of the lever arm 80 to rock the latter either to the right or to the left (Fig. 1) thereby starting the motor 70 and therefore the engine. As soon as the engine gains speed, a member 100 (Fig. 3) is projected to the right in said figure, against the resistance of springs 103 by centrifugal force, with the result that a two-arm lever 104 is forcibly rocked counter-clockwise in said Fig. 3, whereby the notched end of the link 96 (Fig. 2) is kicked upwardly, thereby releasing the spring-loaded lever arm 80 which at once returns to its vertical neutral position wherein the starting motor is disconnected from its source of power, the switch member 76 being in the neutral position shown in Fig. 6. It is contemplated to provide a generator on the same shaft as the electric motor 70 to act as a charger for the battery 72. This is common engineering practice. As a minor detail, the notched end of the link 96 is held up by resting on the upper end of arm 80 to avoid the noise which would otherwise be made by the kicker 104 striking said link 96. Upon return of the controller member 58 and of the link 96 to the neutral position of Fig. 1, the link drops down to engage the upper end of 80 between the shoulders 98 and 99.

Mounted between collars on the cam shaft 20 is an endwise-immovable controller stop 108 (Figs. 1, 2, 3, 4, 6) having a roughly L-shaped slot 111 therein. Projecting into the slot is a roller 110 at the upper end of an arm 112 pivoted to a support 114. As shown, the upper end of the arm 112 is connected by a link 116 to the lever 54. Hence the latter cannot move to the left in Fig. 2 until the longer portion of the slot 111 is in alignment with the pin 110 on the arm 112. The necessary rotary movement of the shaft 20 and of the controller stop 108, which is frictionally mounted on shaft 20, has taken place in Fig. 2 and hence the spring 60 has expanded and moved the lever 54 and with it the cam sleeve 33 to the left in Fig. 2. It follows that sleeve 33 was moved to the left in Fig. 2 by the expansion of the spring 60 when the lever arms 54 and 112 were free to move, also when none of the cams 30, 32 and 34, 36 was so situated as to obstruct movement of the spring pressed sleeve 33, thus bringing certain cams into proper relation to the rolls 46 and 44 (Fig. 1).

The purpose of the controller stop 108 is to permit a certain timed movement of the cam-carrying sleeve or shaft 33 to the right or to the left in Figs. 1 and 2 only when the inlet and exhaust valves will be properly operated, that is, so as not to draw in a charge of gasoline vapor through the intake valve and then discharge it unexploded. Such discharge of unexploded gas would be likely to happen (if not prevented) upon throwing the controller 58 past neutral position from one side to the other in reversing the direction of rotation of the engine. Due to momentum of the shafts and of the relatively heavy fly wheel 16, these parts continue to rotate for a time in the direction in which they were rotating at the time of shifting of the controller 58. If now the cam sleeve 33 could shift with controller 58, the intake valve would be opened by the other intake valve cam on the shifted cam sleeve 33 while the latter is turning in the original direction, with the result that an unexploded charge of vaporized gas would be discharged into the manifold and thence into the surrounding air. To prevent such an occurrence, the cam sleeve 33 is locked against endwise movement by the stop 108 until such stop is moved out of the way following reversal of the cam shaft 20 (Figs. 4 and 6). Such discharge of vaporized gasoline would be particularly undesirable and even dangerous, for instance, in a cabin cruiser or in a military tank. Hence the controller stop 108 has a shoulder at 117 (Fig. 6) to stop movement of roller 110, and hence of lever 54 and sleeve 33, to the left in Figs. 1 and 2 to a position beyond neutral until controller stop 108 has moved with the shaft 20 to the position shown in Figs. 2, 4 and 6. Also shoulder 119 (Fig. 6) would prevent movement of roller 110 and hence of sleeve or shaft 33 to the right to a position beyond neutral until controller stop 108 has rotated with shaft 20 in the reverse direction. The controller stop 108 operates only when the direction of rotation of the cam shaft is reversed and provides for endwise shifting of the cam sleeve 33 to secure operation of the valves in timed relation to the reversed direction of rotation of the shaft.

When the hand control lever 58 is moved in one direction and then in the other to drive the engine in opposite directions (through reversal of the direction of drive of the starting motor, as already described) means is provided to change the timing of the ignition in the ignition chamber. To this end, the link 96 (Figs. 1 and 4) pivoted to the control lever 58 is provided between its ends with insulated blocks 120 (Fig. 6) to engage selectively with an upright pin 121 on a lever 122 pivotally mounted at 124 on insulation on a block (hereinafter described) and arranged to serve as an electrical connection selectively between a wire 126 and two contact points 128, 130 respectively, on an insulated collar 131 fixed on the cam shaft 20. The rear end of lever 122 is made flexible to serve as a brush to contact yieldingly the contact point 128 or 130 (Figs. 3 and 6) which are not in alignment with each other on the collar on the shaft 20. Provision is thus made to change the timing of the ignition upon reversing the direction of rotation of the crank and cam shafts 12 and 20. When the controller member 58 is in its neutral position (Fig. 1), the brush 122 is located between the contact points 128, 130 as in Fig. 6 and the ignition circuit is interrupted. It will be readily understood that the lever 122 will be yieldingly held in its neutral position by means (not shown) similar to the centering means used to hold the lever 80 yieldingly in its neutral position.

In order to retard or to advance the spark in the cycle, depending on the direction of rotation of the shaft 20, the brush lever 122 is mounted on a block 132 pivoted for rocking movement on the shaft 20. An extension 133 from the block 132 rests upon the upper cam edge of a pivoted lever 134 (Figs. 1, 2, 3, 4 and 6) and is held in yielding contact with said edge by a spring which rocks the block 132, and therefore the brush member 122, in a clockwise direction in Fig. 3, when the controller handle 58 is moved over to the left as in Fig. 2. This is because the extension 133 is relatively moved along the cam edge of member 134 until it dropped down on surface 135. On the other hand, movement of the controller lever 58 over to the right from the position shown in Fig. 1 would cause lifting of the extension 133 and of the brush member 122 about the center of the shaft 20, as the said extension rides up on the elevated cam surface 136 of the lever 134. Those movements of the brush member 122 about the center of the shaft 20 advance and retard the spark since contact of the brush 122 with the contact points 128 and 130 is advanced or retarded during rocking movements of the block 132 and brush member 122. Movement of the cam lever 134 is caused by the hand controller member 58 through a link connection 137. When viewed from the left in Figs. 1 and 3, it will be observed that the crank shaft 12 is rotating clockwise (see the arrow on the flywheel 16) and the cam shaft 20 counter-clockwise. This will bring the lower contact 130 upwardly toward the brush 122 on the same side of the oblique line through the center of the shaft 20 in Fig. 3. At the same time the upper cam surface on cam lever 134 is lowering the brush 122 and thus advancing the brush to meet the contact point. Thus the spark is advanced to the maximum as the engine is speeded up by the movement of the controller 58 and of intake control cam 140 to the extreme left as in Fig. 2. As these parts, including controller 58, are moved toward the right from their position in Fig. 2, the spark is retarded until at the neutral or stop position of the controller, the spark is retarded its maximum amount as it should be at the time of stopping and starting of the engine.

Now when the controller 58 is moved toward the right in Figs. 1 and 2, the cam shaft 20 is moved in a clockwise direction, thus bringing the then lower contact 128 upwardly in the reverse rotation of shaft 20, during which the brush lever is lifted by the high part 136 on the cam surface on cam lever 134 to advance the brush to meet the upcoming contact whereby the spark is advanced in the cycle as the engine is speeded up.

Upon inspection of Fig. 6 of the drawings, it will be seen that the brush or contact end of the lever 122 lies between the contact points 128 and 130 and that a slight movement of said brush either to the right or to the left will bring it into position for contact with one or the other contact point 130 or 128, and further that such contact is maintained throughout the whole period of a substantial sidewise movement of the pin 121 Since the cam surfaces 136 and 135, on the cam member 134, are abrupt and at their maximum at the end of the right and left movements of the cam member 134, it is clear that the greater part of the spark advancing and spark retarding operations are taking place while the brush is on one or the other contact point.

In order to control the speed of the engine and particularly the speed with which it picks up on starting the same in either direction, there is provided a cam member 140 (Figs. 1 and 2) connected to the control lever 58 by a link 142. Whereas heretofore the rod 26, 26' has been a single unbroken rod to open the intake valve in internal combustion engines, I provide a rod in two parts 26 and 26', the rod 26 being supported and guided by a member 144 on the surface of the cylinder 10, and the rod 26' by a similar member 145. As shown, the cam 140 is pivoted to the lower end of the rod 26 and is oscillatable by the control lever 58. When the lever 58 is in its central or vertical position, (Fig. 1), the rod 26' does not lift up rod 26 through cam member 140, since in this position of the control lever 58 the rod 26' contacts the most indented part of the lower cam surface of the cam member and the cams on sleeve 33 are not in a position to lift the rod 26'. If however the cam member 140 be swung to either side (as in Fig. 2) a cam surface 146 (or 148) is brought into position above the rod 26'. On subsequent upward movement of the rod 26' (due to the cam 30 or 32), the rod 26 will be lifted to open the intake valve. Moreover, the amount of this lift of the rod 26 will depend on the position of the cam surface 146 (or 148) as there is an increased cam effect until a seat is reached for the upper end of the rod 26' next to the top or abutment 150, at each end of the cam surface, which limits the movement of the cam 140. By moving the cam 140 slowly, the engine is given time to pick up speed against a heavy load. Otherwise, the lever 58 may be moved quickly to its final position, in which case the engine is quickly speeded up, as will be hereinafter described.

Another important advantage of the construction just described resides in the fact that movement of the control lever 58 to neutral or stop position for the engine results in positioning the cam member 140 where the rod 26' cannot lift the cam member 140 and the rod 26 due to the fact that neither of the cams 30, 32 is in position to lift the rod 26'. Hence, during the time that momentum of the crank shaft and fly-wheel continues to rotate the cam sleeve 33, there is no opening of the intake valve in my construction and hence no discharge of unexploded gasoline into the manifold and thence into the air of a cabin motor boat or of a military tank or other enclosed space.

As already noted, the cam surfaces 146 and 148 on cam 140 effect gradual variation in the amount of opening of the intake valve; the greater the opening the more gas is used and the greater the speed, the intake valve as thus controlled taking the place of the usual butterfly valve beyond the carburetor toward the combustion chamber. Again, the rod 26, 26' is lifted always at the same place in the rotating cam shaft or sleeve 33 and the timing is not changed since the rod is simply lifted further and faster the more the cam 140 is swung to the right or to the left in Fig. 2. The greater the movement of the rod 26, 26' the wider is the opening at the intake valve and the greater the speed of the engine. Another advantage is that there is thus accomplished a more thorough mixing of air and of fuel, particularly, at low speed, at the point of entrance to the combustion chamber.

For holding the hand controller 58 in the neutral position shown in Fig. 1 and at either of its extreme positions to the right or left, there is provided a notched bar 160 (Figs. 1, 2 and 4) having a central notch 162 for the central or neutral position of the controller 58, and notches 164, 166 for the right and left extreme positions. For engaging selectively in the notches 162, 164, 166 there is provided a pin 168 (Figs. 4 and 5) which is secured to a finger operated slide 170 on the controller 58, the slide and pin being pressed downwardly by a swing-pressed bolt 172.

From the foregoing description it will be clear that the single controller member 58 is so connected to the cam shaft, to the ignition controlling lever 122, to the intake valve controlling cam 140, and to the control lever 80 for the reversible starting motor, that movement of this manual controller member 58 is sufficient to start the engine in either direction and to bring it to a stop, and to speed up the engine in either direction so that the speed astern will be the same as that ahead so far as this depends upon the R. P. M. of the crank shaft, the ignition circuit being also controlled to secure the proper timing and the spark advanced or retarded in the cycle according to the speed of the engine. It is also clear that the controller 58 may be moved instantly from one side of neutral position to the other side to cause reversal of the engine. While the shafts and the fly wheel will continue to rotate, for some time, in the direction they were rotating in at the time the controller was shifted, such rotation is quickly slowed down due to compression effects in the cylinders and to the fact that the armature shaft (geared to the engine shaft) is rotating against the new magnetic field. No better brakes could be provided since they are yielding and completely automatic. As soon as the shafts have slowed up enough (in a few seconds), the armature shaft of the reversible electric motor 70 starts rotating in the opposite direction and the braking effect disappears. In actual practice, the controller member 58 (when reversing the engine) will be moved beyond neutral position to start the reversible electric motor in the direction to reverse the engine and then, as soon as the engine shafts begin to rotate in said reversed direction, the controller 58 will be moved further to speed up the engine and to advance the spark in the cycle.

Having described my invention, what I claim and desire to secure by Letters Patent of the United States of America is:

1. In an engine having a crank shaft, an intake valve, an exhaust valve, a cam shaft and rods to operate the valves, and an ignition circuit, in association with an electric reversible starting motor and starting means therefor, the combination of a single manual controller member and connections from said member to said cam shaft to shift the latter endwise selectively in accordance with clockwise or counter-clockwise rotation of the shaft, other connections from said controller member to adjust the ignition to the direction of rotation of said cam shaft, and still other connections between said controller member and said starting means to start the motor selectively to drive the cam shaft in either of said directions, said controller member having a neutral position in which the ignition is interrupted whereby the engine comes to rest.

2. An engine constructed according to claim 1 in which means controlled by said manual controller member is provided to control the speed of the engine to retard or advance the spark in accordance with the speed setting of the controller member.

3. An engine constructed according to claim 1 in which means controlled by said manual controller member is provided to vary the opening movement of said intake valve to control the speed of the engine.

4. In an internal combustion engine having a combustion chamber with an intake valve, an exhaust valve, a cam shaft, and operative connections between the cam shaft and said valves whereby the latter are operated in timed relation to each other, the combination of a manual controller member, a member in the operative connection between the cam shaft and the intake valve arranged to be controlled by said controller member to vary the opening of the intake valve and thereby control the speed of the engine, and cam means operated by the said manual controller to retard or to advance the spark in accordance with the speed of rotation of the cam shaft.

5. In an internal combustion engine having a combustion chamber with an intake valve and an exhaust valve, a cam shaft, and operative connections between the cam shaft and said valves whereby the latter are operated in timed relation to each other, the combination of a manual controller member, said cam shaft being movable endwise and having two sets of cams selectively to operate the said valves properly during rotation of the cam shaft in reverse directions, means between said cam shaft and the manual controller member to operate the shaft endwise yieldingly, and a stop member removable with the rotation of the cam shaft in the proper direction to cause the endwise movement of said cam shaft by said yielding means.

6. An engine constructed according to claim 5 in which the stop member frictionally mounted to rotate with the cam shaft controls endwise movement of the cam shaft to secure operation of the proper set of cams for timing of the intake and exhaust valves, following initiation of a reversal of the direction of rotation of the engine, thereby obviating the possibility of a charge of vaporized fuel being drawn into the combustion chamber through the intake valve during rotation of the engine in one direction and then discharged again unexploded through said intake valve following such reversal of the engine.

7. An engine constructed according to claim 5 in which means is provided under control of said manual controller member to advance and to retard in the cycle the operation of the contact points in the ignition circuit.

8. In an internal combustion engine having a combustion chamber with an intake valve and an exhaust valve, a cam shaft, a shaft in axial alignment with the cam shaft to drive the latter, operative connections between the cam shaft and said valves whereby the latter are operated in timed relation to each other, the combination of a manual controller member, said cam shaft being movable endwise and having two sets of cams to operate the said valves properly during rotation of the cam shaft in reverse directions, an ignition circuit comprising contacts points carried by the drive shaft for said cam shaft, means between said cam shaft and the manual controller member to operate the cam shaft endwise yieldingly, and a member movable by the rotation of said cam and drive shafts to lock the cam shaft against endwise movement by said yielding means until the locking member and the cam shaft have rotated a predetermined distance in the new direction upon reversal of the cam shaft, whereby the intake and exhaust valves are properly timed with respect to the direction of rotation of the cam shaft.

9. An engine constructed according to claim 8 in which a stop member frictionally mounted on the drive shaft for the cam shaft controls endwise movement of the cam shaft, thereby obviating the possibility of a charge of vaporized fuel being drawn through the intake valve into the combustion chamber while the engine is rotating in a given direction and then discharged again unexploded through said intake valve upon reversal of the direction of rotation of the engine.

10. An engine having intake and exhaust valve cams on a shaft slidable endwise, and in which contact points of the ignition circuit are carried by a shaft stationary endwise and arranged in axial alignment with respect to said slidable cam shaft, the combination with the cam shaft of a stop member operative to prevent endwise movement of said cam shaft until the latter has rotated a predetermined distance upon reversal of the direction of rotation of the engine and therefore of the cam shaft.

11. An engine having an endwise slidable shaft, intake and exhaust valve cams on said shaft, and a stop member operative to prevent endwise movement of the shaft until the latter has rotated a predetermined distance in the new direction upon reversal of the direction of rotation of the engine and therefore of the said shaft.

12. In an internal combustion engine having a combustion chamber with an intake valve and an exhaust valve, a crank shaft, a cam shaft, and operative connections between the cam shaft and said valves, said cam shaft being movable endwise and having two sets of cams selectively to operate the said valves properly during rotation of the cam shaft in reverse directions, the combination of a manual controller member movable from one side to the other of its neutral or stop position to initiate rotation of the engine shafts in reverse directions, and means automatically operative to effect endwise shifting of the cam shaft only after the latter has begun to rotate in the new direction following movement of said controller member to effect reversal of the direction of rotation of said shafts.

13. An engine constructed according to claim 12 in which movement of the controller member in either direction through its central neutral or stop position compresses a spring to provide power for operation of said automatic means to secure normal operation of the intake and exhaust valves in the new direction of rotation.

14. An engine constructed according to claim 12 in which a shaft stationary endwise is arranged in axial alignment with respect to the movable cam shaft and is rotatable therewith; said endwise stationary shaft carrying circuit making contact points circumferentially and axially spaced with respect to each other and in which said manual controller member operates also to control the speed of the engine and to advance or to retard the spark in the cycle.

15. An engine constructed according to claim 12 in which an electric reversible starting motor is connected to the crank shaft to start the latter selectively in either direction as determined by the direction of movement of the manual controller member, said starting motor serving also as a yielding brake to overcome the momentum of the engine shafts to bring them to rest prior to reversal thereof when said controller member is moved through neutral position to reverse the direction of the engine.

16. An engine constructed according to claim 12 in which an electric reversible starting motor is geared to the crank shaft to start the latter selectively in either direction and automatic means for switching off said starting motor when the engine gets started.

17. In an internal combustion engine having a combustion chamber with an intake valve and an exhaust valve, a crank shaft, a cam shaft having two sets of intake and exhaust valve cams thereon, operative connections selectively between one or the other set of said cams and said valves to operate the latter, means to cause relative movement between the cam shaft and said valve connections selectively to bring one of the two sets of cams into cooperative relation with respect to said valve connections, and a stop member to prevent such relative movement until the cam shaft has rotated a predetermined distance in the new direction upon reversal of the direction of rotation of the engine shafts.

18. In an internal combustion engine having a combustion chamber with an intake valve and an exhaust valve, a crank shaft, a cam shaft, and operative connections between the cam shaft and said valves, said cam shaft being movable endwise and having two sets of cams selectively to operate the said valves properly during rotation of the cam shaft in reverse directions, the combination of a manual controller member movable from one side to the other of its neutral or stop position to initiate rotation of the engine shafts in reverse directions, spring means between said controller member and the cam shaft, and a stop member to prevent endwise movement of the cam shaft beyond its neutral position when moving said controller member through its neutral position, movement of the engine shafts in a direction the reverse of the preceding rotation of said shafts having the effect of moving said stop member to inoperative position, thus freeing the cam shaft for movement by said spring means.

ERASTUS E. WINKLEY.